United States Patent [19]

Haferl

[11] Patent Number: 5,182,504
[45] Date of Patent: Jan. 26, 1993

[54] RASTER DISTORTION AVOIDANCE ARRANGEMENT

[75] Inventor: Peter E. Haferl, Adliswil, Switzerland

[73] Assignee: RCA Thomson Licensing Corporation, Princeton, N.J.

[21] Appl. No.: 843,340

[22] Filed: Feb. 28, 1992

[30] Foreign Application Priority Data

Jan. 8, 1992 [GB] United Kingdom ............... 9200284

[51] Int. Cl.⁵ ............................................. H01J 29/56
[52] U.S. Cl. ..................................... 315/370; 315/408
[58] Field of Search ............................... 315/370, 408

[56] References Cited

U.S. PATENT DOCUMENTS 3,962,603  6/1976  Van Der Vegt ................ 315/370
4,019,093  4/1977  Klein ................................ 315/370
4,238,714 12/1980  Sumi ................................ 315/408
4,612,481  9/1986  Storberg ......................... 315/370
4,707,640 11/1987  Onozawa et al. .

Primary Examiner—Theodore M. Blum
Attorney, Agent, or Firm—Joseph S. Tripoli; Joseph J. Laks; Sammy S. Henig

[57] ABSTRACT

Organ pipes distortions, caused by parasitic ringing in a horizontal deflection current are suppressed by forming a current pulse in a current injection arrangement. The current pulse is coupled to a junction terminal between a terminal of the horizontal deflection winding where a high retrace pulse voltage is developed and a low voltage terminal of a linearity correction inductance. A high voltage terminal of the linearity correction inductance is coupled to a horizontal output transistor. The current pulse begins prior to the end of retrace and ends during the trace interval.

15 Claims, 2 Drawing Sheets

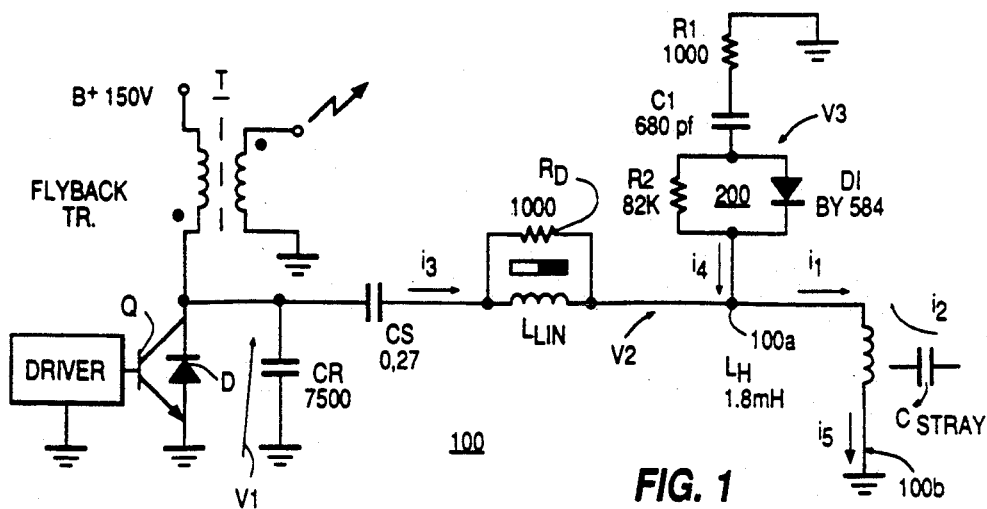
FIG. 1
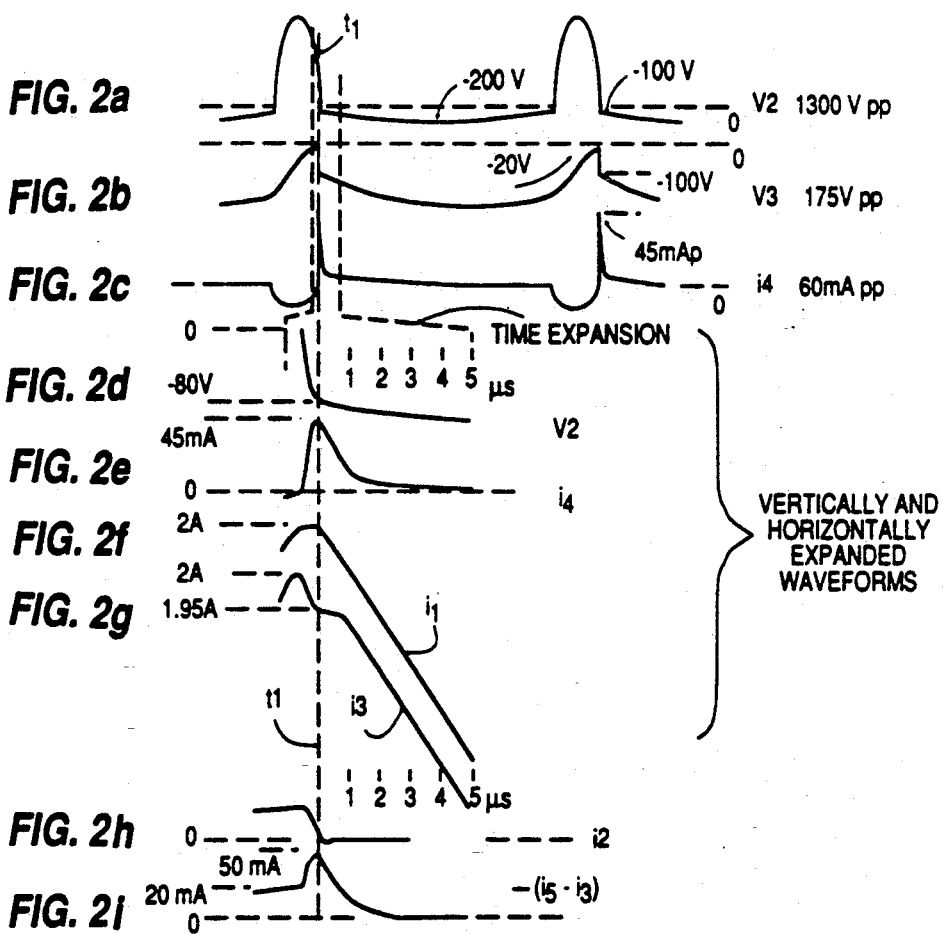

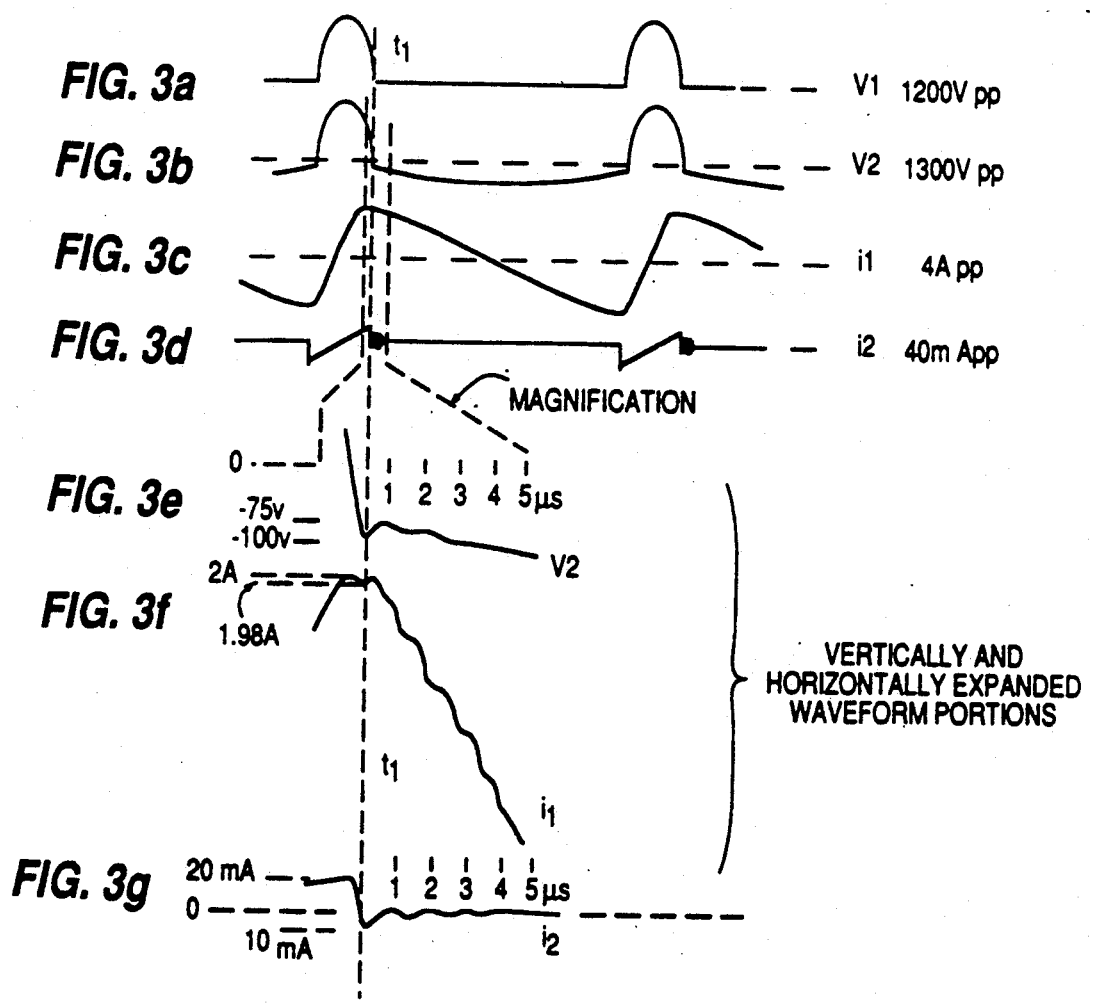

RASTER DISTORTION AVOIDANCE ARRANGEMENT

The invention relates to a deflection circuit of a video display apparatus.

So-called "organ pipes" distortion may appear in the left-hand side of a display screen of a cathode ray tube (CRT) as brightness modulated, vertical stripes. This type of distortion may result from horizontal deflection current ringing that produces a beam velocity modulation visible as vertical stripes. The deflection current ringing may be caused by a stray capacitance, associated with windings of a horizontal deflection winding, immediately after a retrace voltage pulse that is developed across the horizontal deflection winding ceases.

The high rate of change of a retrace voltage pulse that is developed across the deflection winding, during the second half of horizontal retrace, produces a capacitive current pulse flowing in the horizontal deflection winding. This capacitive current pulse ends abruptly at the end of horizontal retrace, when the rate of change of the retrace voltage pulse becomes zero and may produce the deflection current ringing.

Organ pipes distortions may last, for example, 5 μs after a beginning time of the trace interval. Typically, the effect of organ pipes distortion is not visible to the user due to the usage of a high degree of overscan. However, it may be desirable to operate modern full square CRTs with only a low degree of overscan.

Color television receivers or display monitors operating at higher scan rates than, for example, $f_H = 15,625$ Hz, may be even more susceptible to organ pipes distortions. The ringing depends upon the horizontal winding stray capacitance and the retrace pulse voltage width and amplitude and not upon the deflection frequency. When a higher deflection frequency is used, the trace interval is shorter. Therefore, the ringing interval is proportionally greater relative to the trace interval. It may be desirable to suppress the deflection current ringing during the beginning of horizontal trace without using a high degree of overscan.

In a circuit embodying an aspect of the invention, a linearity correcting coil or another suitable inductor is coupled between a deflection switch and the horizontal deflection winding. A current pulse is injected at a junction terminal between the horizontal deflection winding and the linearity correcting coil, during the end of retrace and at the beginning of trace. The injected current is divided between the linearity correcting coil and the horizontal deflection winding. The injected current causes a reduction in the current of the linearity correcting coil that is coupled to the horizontal deflection winding in a manner to compensate for the sudden decrease in the capacitive current in the stray capacitance. In this way, the deflection current ringing is prevented.

In a video display, embodying an aspect of the invention, an inductance is coupled in a current path of a deflection current between a deflection winding and a first switching arrangement. A pulse of current is generated and coupled to the inductance and to the deflection winding via a junction terminal that is in the current path between the inductance and the deflection winding. The pulse of current has both a beginning time and an end time in a vicinity of an instant when a retrace pulse voltage produced in the deflection winding ceases. The pulse of current produces a decrease in a current that flows in the inductance, during a beginning portion of a trace interval.

FIG. 1 illustrates a horizontal deflection circuit with a ringing suppression arrangement, embodying an aspect of the invention;

FIGS. 2a–2i illustrate waveforms useful for explaining the operation of the circuit of FIG. 1 when the ringing suppression arrangement of FIG. 1 is functional; and FIGS. 3a–3g illustrate waveforms that would be obtained in the circuit of FIG. 1 should the ringing suppression arrangement of FIG. 1 be removed.

FIG. 1 illustrates a horizontal deflection circuit 100, embodying an aspect of the invention, operating at a horizontal frequency $f_H = 15,625$ Hz. Deflection circuit 100 includes a flyback transformer T, a deflection switching transistor Q, a damper diode D, a retrace capacitor $C_R$, an S-shaping capacitor $C_S$, a linearity coil $L_{Lin}$ with a parallel coupled damping resistor $R_D$ and a horizontal deflection winding $L_H$. Linearity coil $L_{Lin}$ is coupled between winding $L_H$ and transistor Q.

As shown adjacent to winding $L_H$, a stray or interwinding capacitance $C_{STRAY}$ is associated with the windings of winding $L_H$. Stray capacitance $C_{STRAY}$ is formed between horizontal deflection winding $L_H$ and, for example, a vertical deflection winding, not shown, a yoke ferrite core, not shown, and/or other components in the vicinity. In operation, a ringing suppression network 200, embodying an aspect of the invention, is coupled to a junction terminal 100a, between coil $L_{Lin}$ and winding $L_H$.

For explanation purposes only, assume that network 200 is disconnected from terminal 100a. In this case, deflection circuit 200 operates in a conventional manner. FIGS. 3a–3g illustrate waveforms useful for the explanation of the way Organ Pipes distortions that are produced when circuit 200 is disconnected. Similar symbols and numerals in FIGS. 1 and 3a–3g indicate similar items or functions.

As a result of the switching operation of transistor Q of FIG. 1, a retrace voltage V1 of FIG. 3a is developed across deflection transistor Q of FIG. 1. A retrace voltage V2 of FIG. 3b is developed across winding $L_H$ of FIG. 1. FIG. 3c illustrates a deflection current i1 that is formed externally to winding $L_H$ and in a current path of winding $L_H$ of FIG. 1. FIG. 3d illustrates a waveform of a current i2 flowing through stray capacitance $C_{STRAY}$ associated with winding $L_H$ of FIG. 1. Current i2 represents a difference current, measured between current i1 and a current i5. Current i5 flows to ground from an end terminal 100b of winding $L_H$ that is remote from terminal 100a. Current i2 may be measured using a current probe for obtaining the current difference between currents i1 and i5.

During the second half of retrace, current i1 is smaller than current i5 because of the effect of current i2. Current i2 affects horizontal scanning because current i2 flows through the windings of horizontal deflection winding $L_H$. Capacitive current i2 is dependent on the rate of change of retrace voltage V2. Current i2 has a positive peak amplitude in the vicinity of an end time, t1, of the retrace interval where the high frequency content of retrace voltages V1 and V2 is the largest. When the rate of change of voltage V2 becomes zero, current i2 becomes zero.

The fast decrease of current i2 to zero, at the end of retrace, produces current ringing, as illustrated in FIG. 3d. Organ Pipes distortions may be formed by current ringing in winding $L_H$ of FIG. 1 following time t1 of FIG. 3d, the end of retrace. The waveforms of FIGS. 3e–3g are shown in the vicinity of time t1 of FIGS. 3a–3d, but with expanded amplitude and with an expanded time base relative to those of FIGS. 3a–3d. Ringing of current i2 of FIG. 3g subtracts from current i1 of FIG. 3f and appears superimposed on deflection current i1 that is coupled to deflection winding $L_H$ of FIG. 1.

Current i1 of FIG. 3f increases at time t1 by the same amount as current i2 of FIG. 3g decreases. The ringing of current i2 during the 5 μs interval of FIG. 3g that follow time t1 is superimposed upon the downramping or trace portion of current i1 of FIG. 3f that is coupled to winding $L_H$ of FIG. 1. The ringing appears also superimposed on retrace voltage V2 of FIG. 3e, at the beginning of trace. The ringing is caused by the fast fall time of current i2 of FIG. 3g after time t1.

In carrying out an inventive feature, ringing suppression network 200 of FIG. 1, reduces such ringing. Network 200 includes a series arrangement of a resistor R1, a capacitor C1 and a parallel arrangement that includes a resistor R2 and a switching diode D1. Advantageously, linearity coil $L_{Lin}$ is interposed between deflection transistor Q and winding $L_H$ for separating winding $L_H$ from transistor switch Q. Linearity coil $L_{Lin}$ is nonsaturated at the beginning of trace and operates as an inductor having an inductance of about 10%–20% of the inductance of winding $L_H$.

FIGS. 2a–2i illustrate waveforms useful for explaining the operation of the circuit of FIG. 1 when network 200 is included in the circuit. Similar symbols and numerals in FIGS. 1, 2a–2i and 3a–3g indicate similar items or functions. In FIGS. 2d–2i, the amplitude and the time base are expanded in the vicinity of time t1 relative to those of FIGS. 2a–2c.

Capacitor C1 of FIG. 1 is charged, during retrace, via resistors R2 and R1 to a voltage V3 of minus 20 volts with respect to ground, as shown in FIG. 2b. Retrace voltage V2 of FIG. 2a drops to minus 100 volts at the vicinity of time t1, the end of retrace, and discharges capacitor C1 of FIG. 1 via diode D1 and resistor R1. This injects a pulse of a current i4 of FIG. 2c into a junction terminal 100a of FIG. 1 between winding $L_H$ and linearity coil $L_{Lin}$. Injected pulse current i4 is divided between coil $L_{Lin}$ and winding $L_H$ according to the ratio of the inductances of winding $L_H$ and linearity coil $L_{Lin}$. A greater portion of pulse current i4 flows through linearity coil $L_{Lin}$ because of its relatively low inductance and subtracts from current i3 of FIG. 2g. This causes a decrease of current i3 in the vicinity of time t1. The pulse of current i4 starts to increase at a fast rate just before time t1, it reaches its peak amplitude at time t1 and then has a slow fall time, as shown in FIG. 2e.

In accordance with an inventive feature, the suppression of the deflection current ringing is obtained by the decrease of current i3 of FIG. 2g, during the aforementioned short interval in the vicinity of time t1. The decrease in current i3 is produced by injected current i4 of FIG. 2e. As a result, deflection current i1 of FIG. 2f is prevented from increasing after current i2 of FIG. 2h abruptly decreases to zero. The smaller portion of current i4 of FIG. 2e flows into winding $L_H$ and prevents deflection current i1 of FIG. 2f from decreasing prior to time t1.

Advantageously, the slow fall time of the pulse of current i4 of FIG. 2e, following time t1, provides a smooth or gradual transient between currents i1 and i3. Following the short interval at the beginning of trace, when current i3 is smaller than current i1, currents i1 and i3 have the have same waveform and amplitude, during the remaining trace interval, as shown in FIGS. 2f and 2g, respectively. Advantageously, as a result of the current injection of current i4 of FIG. 2e, the ringing that occur in current i2 of FIG. 3g no longer occur in current i2 of FIG. 2h.

FIG. 2i illustrates a waveform depicting a difference between currents i5 and i3. The waveform of FIG. 2i shows that the greater portion of current i4 of FIG. 2e in linearity coil $L_{Lin}$ of FIG. 1 is subtracted from current i3 of FIG. 2g. Current difference, i5−i3, of FIG. 2i decreases slowly after time t1 of FIG. 2h, providing a smooth transient of voltage V2 of FIG. 2d at the end of retrace and the beginning of trace. The peak of current i4 of FIG. 2e occurs at the end of retrace, when the rate of change of voltage V2 of FIG. 2a is zero. Advantageously, as a result of current i4 of FIG. 1, voltage V2 does not include ringing.

A conventional East-West raster correction circuit may be coupled to end terminal 100b of winding $L_H$ that is remote from linearity coil $L_{Lin}$, in a conventional manner not shown. In this way, both East-West raster distortion correction and suppression of Organ Pipes ringing may be maintained.

An arrangement similar to that shown in FIG. 1 may be implemented to provide horizontal deflection for a 34", 16:9 aspect ratio CRT, operating at a horizontal frequency $2f_H$. In this case, winding $L_H$ has an inductance of 350 μH, resistor R1 has a value of 330 Ohm, resistor R2 has a value of 68 K-Ohm and capacitor C1 has a value of 470 pF.

The values of capacitor C1 and resistor R2 are selected in such a way that voltage V3 of FIG. 2b is higher, or less negative, than voltage V2 of FIG. 2a at time t1. The voltage difference, V3−V2, and the values of capacitor C1 of FIG. 1 and of resistor R1 determine the peak amplitude of current i4 of FIG. 2e. The fall time of the pulse of current i4 is determined by resistor R1 and capacitor C1 of FIG. 1.

Stray capacitance $C_{STRAY}$ is dependent on winding $L_H$. The amplitude of current i2 strongly depends on the amplitude, pulse-width and the rate of change of voltage V2. Therefore, the values of resistors R1 and R2 and of capacitor C1 are selected based on such parameters. Advantageously, because current injection is provided in an AC coupling manner via capacitor C1, DC offset current in winding $L_H$ is prevented.

What is claimed is:

1. A video display deflection apparatus comprising:
a deflection winding;
a retrace capacitance coupled to said deflection winding to form a retrace resonant circuit;
first switching means coupled to said deflection winding for producing a deflection current and a retrace pulse voltage therein;
an inductance coupled in a current path of said deflection current between said deflection winding and said first switching means;
means for generating a pulse of current that is coupled to said inductance and to said deflection winding via a junction terminal, that is in said current path between said inductance and said deflection winding, said pulse of current having both a beginning time and an end time in a vicinity of an instant when said retrace pulse voltage ceases, said pulse of current producing a decrease in a current that flows in said inductance, during a beginning portion of a trace interval.

2. An apparatus according to claim 1 wherein said pulse of current is AC-coupled to said inductance and to said deflection winding.

3. An apparatus according to claim 1 wherein said inductance comprises a linearity correction inductance.

4. An apparatus according to claim 1 wherein said pulse of current generating means comprises a first resistor and a second capacitor coupled in series.

5. An apparatus according to claim 4 further comprising, a diode coupled between said second capacitor and said junction terminal.

6. An apparatus according to claim 5 further comprising, a second resistor coupled in parallel with said diode.

7. A video display deflection apparatus, comprising:
a deflection winding;
a retrace capacitance coupled to said deflection winding to form a retrace resonant circuit;
first switching means coupled to said deflection winding for generating a resonant retrace pulse voltage at a first terminal of said deflection winding and a deflection current in said deflection winding, said retrace pulse voltage producing a capacitive current in an inter-winding capacitance of said deflection winding that decreases when said retrace pulse voltage ceases, said decrease in said capacitive current producing an increase in a current that flows in said first terminal; and
means coupled to said terminal for generating a current pulse in a current path that includes said terminal, when said retrace pulse ceases, in a manner to reduce a rate of said increase of said first terminal current such that following a beginning portion of a trace interval, said current pulse ceases.

8. An apparatus according to claim 7 wherein said terminal is coupled between said deflection winding and said first switching means.

9. An apparatus according to claim 7 further comprising, a linearity coil coupled between said first switching means and between said deflection winding and said current pulse generating means.

10. An apparatus according to claim 9 wherein said current pulse generating means is coupled between said linearity coil and said deflection winding.

11. An apparatus according to claim 9 wherein said current pulse causes a current that flows in said linearity coil to decrease, during said beginning portion of said trace interval.

12. An apparatus according to claim 7 wherein said current pulse generating means comprises a third capacitance that is coupled to said resonant circuit for applying said retrace pulse voltage to said third capacitance to develop a voltage in said third capacitance, during said retrace interval, said third capacitance voltage producing said current pulse and second switching means for decoupling said third capacitance from said deflection winding, during a portion of said trace interval that follows said beginning portion of said trace interval.

13. An apparatus according to claim 7 wherein said current pulse causes a parasitic ringing in said deflection current to be suppressed for preventing organ pipes distortions.

14. An apparatus according to claim 7 wherein said deflection winding comprises a horizontal deflection winding.

15. A video display deflection apparatus, comprising:
a deflection winding;
a retrace capacitance coupled to said deflection winding to form a retrace resonant circuit;
first switching means coupled to said deflection winding for producing a deflection current and a retrace pulse therein;
an inductance coupled in a current path of said deflection current between said deflection winding and said first switching means;
a series arrangement of a resistor and a second capacitor for producing from said retrace pulse voltage a current that charges said second capacitor such that said resistor limits said charging current; and
second switching means coupled to said second capacitor for generating a pulse of current from the charge in said second capacitor in a manner that bypasses said resistor so as to prevent said resistor from limiting said current pulse, said current pulse being coupled to said inductance and to said deflection winding via a junction terminal that is in said current path between said inductance and said deflection winding.

* * * * *